US009463818B2

(12) United States Patent
Schoonmaker et al.

(10) Patent No.: US 9,463,818 B2
(45) Date of Patent: *Oct. 11, 2016

(54) SYSTEMS FOR CONTROLLING A VEHICLE SYSTEM FACTORING MASS ATTRIBUTABLE TO WEATHER

(71) Applicant: General Electric Company, Schenectady, NY (US)

(72) Inventors: William Cherrick Schoonmaker, Melbourne, FL (US); Jared Klineman Cooper, Melbourne, FL (US); John Welsh McElroy, Melbourne, FL (US); Stephen Craig Shelton, Melbourne, FL (US); David Michael Peltz, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/960,387

(22) Filed: Dec. 6, 2015

(65) Prior Publication Data
US 2016/0082989 A1 Mar. 24, 2016

Related U.S. Application Data

(63) Continuation of application No. 14/282,434, filed on May 20, 2014, now Pat. No. 9,233,697.

(60) Provisional application No. 61/827,061, filed on May 24, 2013.

(51) Int. Cl.
*B60K 23/08* (2006.01)
*B61L 15/00* (2006.01)
*B61L 3/00* (2006.01)
*G01G 19/08* (2006.01)
*G01W 1/00* (2006.01)

(52) U.S. Cl.
CPC ............ *B61L 15/0081* (2013.01); *B61L 3/006* (2013.01); *G01G 19/08* (2013.01); *G01W 1/00* (2013.01)

(58) Field of Classification Search
USPC ....................................... 701/439, 14, 19, 20
See application file for complete search history.

(56) References Cited

U.S. PATENT DOCUMENTS

| | | | | |
|---|---|---|---|---|
| 6,381,538 | B1 * | 4/2002 | Robinson | G01C 23/00 701/439 |
| 6,842,689 | B2 * | 1/2005 | Andres | F02D 41/021 123/350 |
| 8,135,500 | B1 * | 3/2012 | Robinson | G01C 23/00 701/14 |
| 8,395,534 | B2 * | 3/2013 | Christophe | G01C 23/005 340/970 |
| 9,019,146 | B1 * | 4/2015 | Finley | G01S 13/95 342/175 |

(Continued)

*Primary Examiner* — Thomas Tarcza
*Assistant Examiner* — Richard Goldman
(74) *Attorney, Agent, or Firm* — GE Global Patent Operation

(57) ABSTRACT

A system includes a weight determination device and a trip control system. The weight determination device is configured to receive weather data of weather at least one of encountered or to be encountered by one or more vehicles in a vehicle system traveling on a trip along a route, and to determine a first estimated weight of the vehicle system based at least in part on the weather data. The first estimated weight accounts for mass attributable to the weather. The trip control system is configured to control the vehicle system for movement along the route based at least in part on the first estimated weight and/or display information of the first estimated weight on a display device for an operator to control the vehicle system for movement along the route based at least in part on the information of the first estimated weight that is displayed.

20 Claims, 3 Drawing Sheets

(56) References Cited

U.S. PATENT DOCUMENTS

| | | | | |
|---|---|---|---|---|
| 9,057,773 B1* | 6/2015 | Fersdahl | ............... | G01S 13/953 |
| 2005/0228553 A1* | 10/2005 | Tryon | ...................... | B60K 6/46 |
| | | | | 701/22 |
| 2012/0041627 A1* | 2/2012 | Kelty | ................. | B60L 11/1862 |
| | | | | 701/22 |
| 2014/0214267 A1* | 7/2014 | Sellschopp | ............. | G06F 17/00 |
| | | | | 701/34.2 |
| 2014/0297145 A1* | 10/2014 | Nihanda | ............ | B60K 23/0808 |
| | | | | 701/69 |
| 2014/0350747 A1* | 11/2014 | Blum | .................. | B60W 50/085 |
| | | | | 701/1 |
| 2014/0350756 A1* | 11/2014 | Schoonmaker | ......... | B61L 3/006 |
| | | | | 701/19 |

* cited by examiner

SYSTEMS FOR CONTROLLING A VEHICLE SYSTEM FACTORING MASS ATTRIBUTABLE TO WEATHER

CROSS-REFERENCE TO RELATED APPLICATIONS

This application is a continuation of U.S. application Ser. No. 14/282,434 filed May 20, 2014, which claims the benefit of U.S. Provisional Application No. 61/827,061, filed May 24, 2013, both of which are incorporated herein by reference in their entireties.

FIELD

Embodiments of the subject matter described herein relate to powered vehicle systems traveling on trips along routes.

BACKGROUND

Known vehicle systems include one or more propulsion-generating vehicles or units and, in certain cases, one or more non-propulsion-generating vehicles or units connected with each other to travel along a route. The propulsion-generating vehicles supply tractive force to propel the propulsion-generating vehicles and non-propulsion-generating vehicles along a route.

The tractive force required to propel the propulsion-generating vehicles and non-propulsion-generating vehicles along the route may vary due to various parameters, such as vehicle system length, vehicle system weight, grade of the route, route conditions, weather, and performance characteristics of the propulsion-generating vehicles, among others. For example, a vehicle system traveling through strong winds may require a greater tractive force than otherwise would be necessary in order to overcome the drag force on the vehicles from the wind. In another example of how weather affects required tractive forces, rain or other precipitation on rails may require more power from locomotives on a vehicle system due to less adhesion between the wheels of the locomotive and the rails. In yet another example, weather may affect required tractive forces by affecting the weight of the vehicle system, such as in the case of a gain in mass due to retention of rain water in non-propulsion-generating vehicles.

Presently, trips taken by vehicle systems may be planned with a focus on energy efficiency. To enhance efficiency, vehicle system trip planning may take into account many parameters, such as the parameters mentioned above and more. Accurate calculations of weight and other parameters are important for trip planning purposes in order to improve handling and control of the vehicle system during the trip.

When the parameters relied on during trip planning are not accurate, the vehicle system may have to undergo a trip re-plan, which is a re-adjustment. For example, the weight of a vehicle system relied on during trip planning may be the sum of the individual weights of the vehicles in the vehicle system (when empty) with the weight of cargo added. However, if the vehicle system travels through a rain storm during its trip, each vehicle may retain, for example, two extra tons of rain water. If each of the vehicles weighed 100 tons dry, then each now weighs 102 tons, which is a 2% increase in weight from the added water mass. The trip was planned for a vehicle system weighing 2% less than the vehicle system now weighs, so the vehicle system may have to undergo a trip re-plan based on the weight discrepancy. Among other things, a trip re-plan is an opportunity loss because it represents that the vehicle system was not traveling as efficiently as the vehicle system would have been with more accurate parameters in the trip planning.

BRIEF DESCRIPTION

In an embodiment, a system includes a weight determination device and a trip control system. The weight determination device is configured to receive weather data of weather at least one of encountered or to be encountered by one or more vehicles in a vehicle system traveling on a trip along a route, and to determine a first estimated weight of the vehicle system based at least in part on the weather data. The first estimated weight accounts for mass attributable to the weather. The trip control system is configured to control the vehicle system for movement along the route based at least in part on the first estimated weight and/or display information of the first estimated weight on a display device for an operator to control the vehicle system for movement along the route based at least in part on the information of the first estimated weight that is displayed.

In an embodiment, a system includes a weight determination device and a trip control system. The weight determination device is configured to determine a precipitation retention mass associated with at least one vehicle of a vehicle system based on received weather data of weather at least one of encountered by the at least one vehicle prior to a trip or to be encountered by the at least one vehicle while traveling along a route during the trip. The trip control system is configured to generate a trip plan based at least in part on the precipitation retention mass, wherein the trip plan comprises operational settings of the vehicle system as a function of at least one of time or location along the trip. The trip control system also is configured to control the vehicle system along the route during the trip according to the trip plan and/or control display of the operational settings to an operator of the vehicle system for the operator to control the vehicle system along the route during the trip according to the operational settings.

In an embodiment, a method (e.g., for controlling a vehicle system factoring mass attributable to weather) is provided that includes receiving weather data of weather at least one of encountered or to be encountered by one or more vehicles in the vehicle system traveling on a trip along a route. The method also includes, based at least in part on the weather data, determining a first estimated weight of the vehicle system. The first estimated weight accounts for mass attributable to the weather. The method further includes controlling movements of the vehicle system during the trip based at least in part on the first estimated weight of the vehicle system.

Optionally, the method may further include generating a first trip plan based in part on the first estimated weight. The first trip plan includes operational settings that are designated for the vehicle system during the trip according to locations of the vehicle system as the vehicle system travels along the route. The movements of the vehicle system during the trip may be controlled according to the operational settings prescribed in the first trip plan based on where the vehicle system is located along the route. Optionally, while controlling the movements of the vehicle system according to the first trip plan, the method may further include determining a difference between an actual movement of the vehicle system and an expected movement of the vehicle system. If the difference is greater than a designated threshold, the method may include determining a second estimated weight of the vehicle system, generating a second trip plan based in part on the second estimated weight, and controlling movements of the vehicle system according to the second trip plan.

In an embodiment, a system includes a weight determination device and a trip planner device. The weight determination device is configured to receive weather data of weather at least one of encountered or to be encountered by one or more vehicles in a vehicle system traveling on a trip along a route. The weight determination device is further configured to determine a first estimated weight of the vehicle system based at least in part on the weather data. The first estimated weight accounts for mass attributable to the weather. The trip planner device is configured to generate a first trip plan based in part on the first estimated weight. Movements of the vehicle system during the trip are controlled according to the first trip plan.

In an embodiment, a method is provided that includes determining a precipitation retention mass associated with at least one vehicle of a vehicle system. The precipitation retention mass is determined based on received weather data of weather at least one of encountered by the at least one vehicle prior to a trip or to be encountered by the at least one vehicle while traveling along a route during the trip. The method also includes generating a trip plan based at least in part on the precipitation retention mass. The trip plan includes operational settings of the vehicle system as a function of at least one of time or location along the trip. The method further includes controlling the vehicle system along the route during the trip according to the trip plan.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
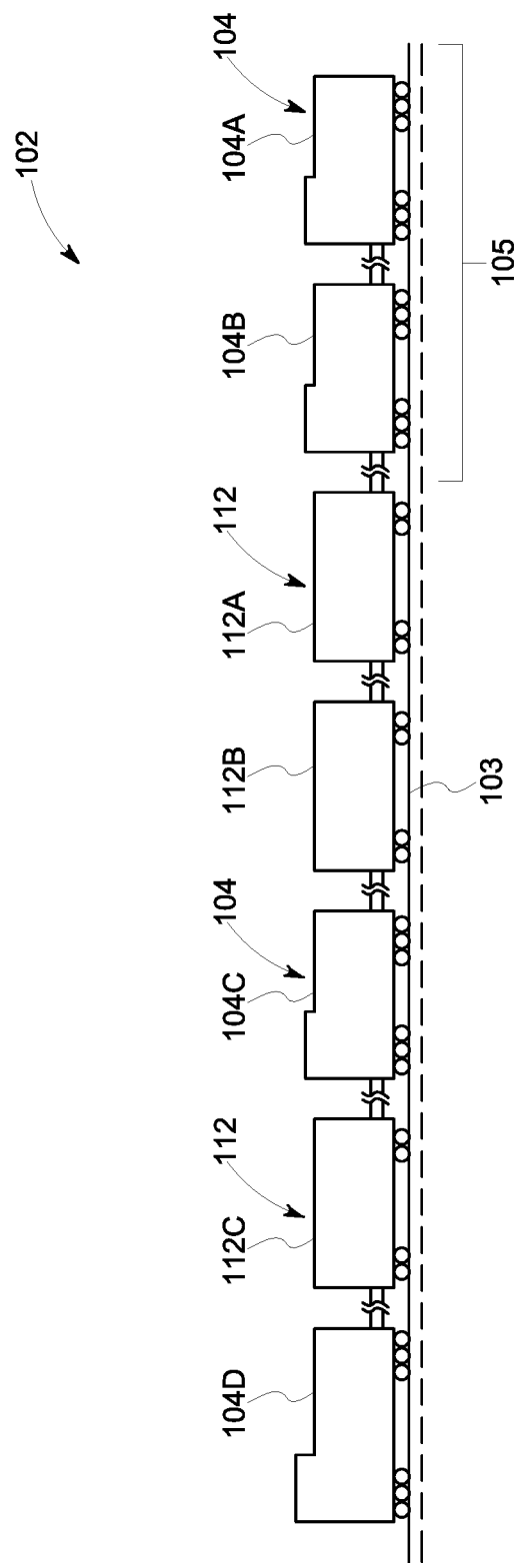
FIG. 1 is a schematic illustration of a vehicle system in accordance with an embodiment.

The foregoing summary, as well as the following detailed description of certain embodiments of the inventive subject matter, will be better understood when read in conjunction with the appended drawings. To the extent that the figures illustrate diagrams of the functional blocks of various embodiments, the functional blocks are not necessarily indicative of the division between hardware and/or circuitry. Thus, for example, one or more of the functional blocks (for example, processors, controllers, or memories) may be implemented in a single piece of hardware (for example, a general purpose signal processor, microcontroller, random access memory, hard disk, or the like). Similarly, any programs and devices may be standalone programs and devices, may be incorporated as subroutines in an operating system, may be functions in an installed software package, or the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" or "an embodiment" of the inventive subject matter are not intended to be interpreted as excluding the existence of additional embodiments that also incorporate the recited features. Moreover, unless explicitly stated to the contrary, embodiments "including," "comprising," or "having" (and various forms thereof) an element or a plurality of elements having a particular property may include additional such elements not having that property.

As used herein, the terms "module", "system," "device," or "unit," may include a hardware and/or software system and circuitry that operates to perform one or more functions. For example, a module, unit, device, or system may include a computer processor, controller, or other logic-based device that performs operations based on instructions stored on a tangible and non-transitory computer readable storage medium, such as a computer memory. Alternatively, a module, unit, device, or system may include a hard-wired device that performs operations based on hard-wired logic and circuitry of the device. The modules, units, or systems shown in the attached figures may represent the hardware and circuitry that operates based on software or hardwired instructions, the software that directs hardware to perform the operations, or a combination thereof.

The term "mass" refers to the amount of matter in an object, and "weight" refers to the force of gravity on the object. Weight is calculated as the mass times the force of gravity. The terms "mass" and "weight" are generally synonymous in meaning as used herein because the force of gravity is assumed to be a constant. However, as used herein, "mass" is generally used in discussing matter itself (e.g., a mass of retained precipitation on a vehicle), while "weight" is generally used as a measurement of the matter (e.g., retention of precipitation increases the weight of a vehicle).

One or more embodiments disclosed herein describe a method and system used in conjunction with a vehicle system traveling on a trip along a route. The vehicle system may include at least one propulsion-generating vehicle that is coupled to and hauls one or more non-propulsion-generating vehicles. The non-propulsion-generating vehicles may be configured to receive a load including cargo/freight or passengers. The movements of the vehicle system traveling along the route during the trip are controlled. For example, a trip control system may control the movements of the vehicle system during the trip by producing a trip plan. The trip control system may consider various parameters when producing the trip plan, among them the weight of the vehicle system.

In one or more embodiments, the weight of the vehicle system traveling on the trip along the route is determined, and the weight used as a parameter when controlling the movements of the vehicle system during the trip. The weight may be determined by a weight determination device. The weight of the vehicle system while traveling on the trip may change due to weather. For example, when traveling through a storm, the vehicle system may gain mass due to retention of precipitation (e.g., rain, snow, sleet, hail, etc.) on/in the vehicles, which is referred to herein as "precipitation retention mass". Therefore, the vehicle system may add weight (e.g., precipitation retention mass) during the trip as a result of weather encountered during the trip. This mass gain may be between 1-2 tons per vehicle in the vehicle system. Conversely, the vehicle system may lose mass as previously-retained precipitation evaporates and/or drains from the vehicles in warm, dry weather. The weight of the vehicle system along the trip is determined prior to the vehicle system starting the trip. As such, the determined weight accounts for changes in the weight of the vehicle system attributable to the weather that will be encountered along the route.

By accounting for mass attributable to weather, the determined weight of the vehicle system is more accurate than a determination of weight that does not consider the effect that weather has on the weight. Since the movements of the vehicle system during the trip are controlled at least in part on the determined weight of the vehicle system, a more accurate determination of weight will produce better control and handling of the vehicle system. For example, when a trip plan is produced prior to the trip, more accurate parameters, such as a more accurate weight determination of the vehicle system, will yield an improved trip plan with greater energy efficiency and fewer trip re-plans (e.g., adjustments to the trip plan).

A more particular description of the inventive subject matter briefly described above will be rendered by reference to specific embodiments thereof that are illustrated in the appended drawings. The inventive subject matter will be described and explained with the understanding that these drawings depict only typical embodiments of the inventive subject matter and are not therefore to be considered to be limiting of its scope. Wherever possible, the same reference numerals used throughout the drawings refer to the same or like parts. Although some embodiments of the inventive subject matter are described with respect to trains, locomotives, and other rail vehicles, embodiments of the inventive subject matter also are applicable for use with vehicles generally, such as off-highway vehicles, agricultural vehicles, transportation vehicles, and/or marine vessels.

FIG. 1 schematically illustrates a vehicle system 102 in accordance with an embodiment. As used herein, the term "vehicle system" includes one or more propulsion-generating vehicles that generate tractive effort to travel along a route. The vehicle system 102, traveling along a route 103, includes plural propulsion-generating vehicles 104 (e.g., vehicles 104A-D) that are mechanically interconnected with each other in order to travel along the route 103 together. Two or more of the propulsion-generating vehicles 104 may be mechanically and/or logically linked to form a group or consist 105, as illustrated in FIG. 1. The vehicle system may include a single consist, or multiple consists interspersed along the vehicle system. In a distributed power operation, a vehicle system may have a lead consist, which includes the lead vehicle mechanically linked to one or more remote vehicles, and may also have one or more remote consists, formed entirely of remote vehicles, positioned at a different location in the vehicle system.

One or more propulsion-generating vehicles 104 may be separated from other propulsion-generating vehicles 104 by one or more non-propulsion-generating vehicles 112 (e.g., vehicles 112A-C). The non-propulsion-generating vehicles 112, also referred to herein as non-propulsion vehicles 112, do not generate tractive effort but are coupled to and propelled along the route 103 by the propulsion-generating vehicles 104. The non-propulsion-generating vehicles 112 may be configured to carry a load for transport, such as passengers or cargo. Cargo may include bulk material (e.g., coal, steel, wood, etc.), intermodal containers, general freight, and the like. The number and arrangement of the propulsion-generating vehicles 104 and non-propulsion vehicles 112 illustrated in FIG. 1 is merely an example, as other embodiments of the inventive subject matter may use different vehicle arrangements and/or different numbers of propulsion and non-propulsion vehicles. For example, the vehicle system may include a greater proportion of non-propulsion vehicles to propulsion-generating vehicles.

Figure 2:
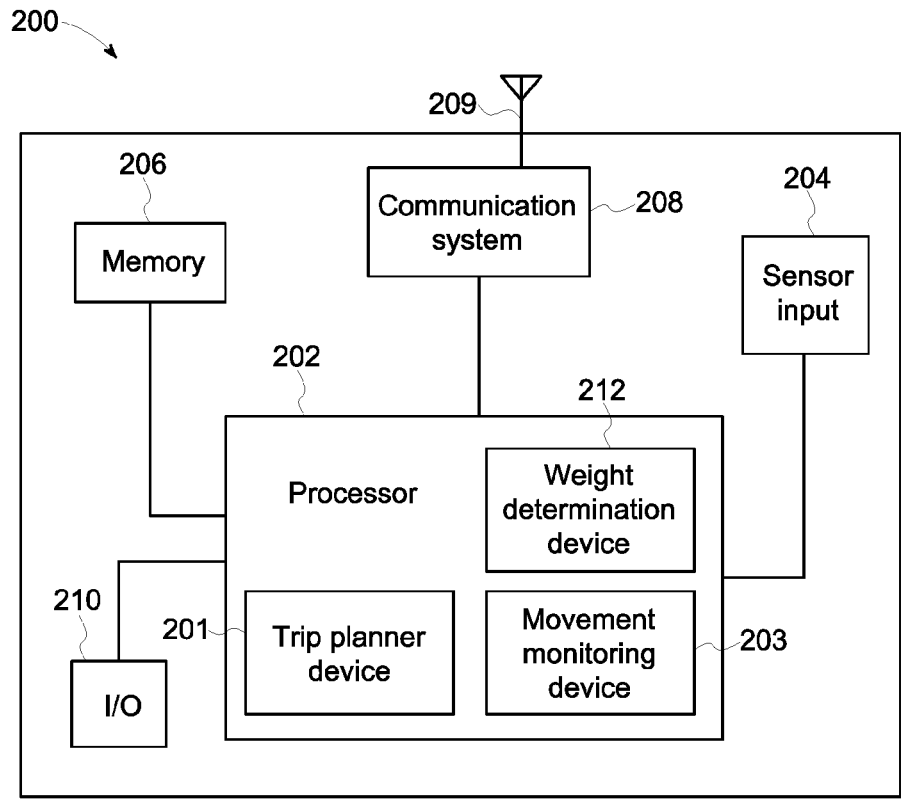
FIG. 2 illustrates a trip control system in accordance with an embodiment.

In an embodiment, the vehicle system 102 may be a train configured to operate on rails. The propulsion-generating vehicles 104 may be locomotives interspersed among a plurality of rail cars throughout the length of the train to supply motive power and braking action for the train. In other embodiments, the propulsion-generating vehicles 104 may be other off-highway vehicles (e.g., mining vehicles and other vehicles that are not designed for or permitted to travel on public roadways), marine vessels, and the like FIG. 2 illustrates a trip control system 200 in accordance with an embodiment. The trip control system 200 may be located on a vehicle of a vehicle system, such as vehicle system 102 (shown in FIG. 1). Alternatively, the trip control system 200 may be located off-board the vehicle system, such as at a dispatch location. The trip control system 200 is configured to receive and interpret various input information regarding an upcoming trip and to provide control for the vehicle system along the route during the trip. It should be noted that while a particular computing or operating environment may be described herein, the computing or operating environment is intended to illustrate operations or processes that may be, implemented, performed, and/or applied to a variety of different computing or operating environments. Thus, FIG. 2 illustrates a non-limiting example of a computing system that may perform one or more methods or processes as described in more detail herein. The trip control system 200 may be provided, for example, as any type of computing device, including, but not limited to, personal computing systems, among others.

The trip control system 200 includes a logic subsystem, which is provided as a processor 202 that is configured to execute one or more instructions (for example, software instructions) that are part of one or more programs, routines, objects, components, data structures, or other logical constructs. Such instructions may be implemented to perform a task, implement a data type, transform the state of one or more devices, or otherwise arrive at a desired result. Additionally or alternatively, the processor 202 may include one or more hardware or firmware logic machines configured to execute hardware or firmware instructions. The processor 202 may optionally include individual components that are distributed throughout two or more devices, which may be remotely located in some embodiments. For example, the processor 202 may include a weight determination device 212, a trip planner device 201, and a movement monitoring device 203. The weight determination device 212 is configured to interpret both weather data and vehicle system makeup information to determine an estimated weight of the vehicle system as the vehicle system travels along the route. The trip planner device 201 is configured to generate a trip plan for the vehicle system based at least in part on the estimated weight of the vehicle system. The movement monitoring device 203 is configured to monitor the movement of the vehicle system during the trip to determine how closely the expected movement of the vehicle system according to the trip plan mimics the actual movement of the vehicle system. As shown in FIG. 2, each of the weight determination device 212, trip planner device 201, and movement monitoring device 203 may be incorporated as subroutines in the processor 202. Alternatively, the weight determination device 212, the trip planner device 201, and/or the movement monitoring device 203 may be stand-alone devices within the trip control system 200 separate from although communicatively coupled to the processor 202.

The trip control system 200 may be configured to receive weather data from various sources in order to determine how weather encountered by the vehicles has affected and/or will affect the weight of the vehicle system. For example, the trip control system 200 may include a sensor input 204 that communicates with sensors (not shown) located on the vehicles in the vehicle system. The sensors may be precipitation sensors located on propulsion-generating vehicles and/or non-propulsion vehicles that provide rainfall data to the sensor input 204, which conveys the information to the processor 202. For example, precipitation sensors may be placed on a subset of the non-propulsion vehicles and used to determine the amount of rainfall retained within the subset of non-propulsion vehicles, which can then be extrapolated to represent retained rainfall on the entire vehicle system. Other sensors may be used in addition to or as an alternative to precipitation sensors, including thermometers, barometers, and/or hygrometers. For example, a hot temperature and low humidity may indicate that rain or other precipitation retained in the vehicles will evaporate at a fast rate during the trip, drying the vehicles and therefore decreasing the weight of the vehicle system. Warm temperature may also melt ice and snow, allowing the liquid water to drain from drainage conduits on the vehicles. As such, the mass attributable to weather may increase and/or decrease during a trip, not just increase due to retention of precipitation.

The trip control system 200 may further include a memory 206, which is an electronic storage device used to store trip data, vehicle data, and the like, which is readily provided to the processor 202. For example, the memory 206 may store vehicle makeup information, including the number of non-propulsion vehicles and propulsion vehicles in the vehicle system. This information is useful when extrapolating data recorded from a subset of vehicles in order to represent the entire vehicle system, as discussed above. In addition, the memory 206 may store information on the type of vehicles in the vehicle system and the type of cargo within the vehicles. For example, if the non-propulsion vehicles are open-topped hopper vehicles, the vehicles may collect more precipitation than covered vehicles. Although some if not most open hopper vehicles contain built-in drains, precipitation may still be retained in the cargo itself. For example, bulk cargo such as sand and powdered coal may retain more precipitation mass in the fine particles than larger cargo objects, like scrap metal. Furthermore, the cargo may affect retention of precipitation mass by blocking some or all of the drains in the vehicles, preventing precipitation mass from draining. In addition, snow and ice may be more resistant to draining than other forms of precipitation, like rain. Thus, by storing information related to the types of cargo and vehicles in the vehicle system in the memory 206, the trip control system 200 may be able to make predictions about how weather encountered by the vehicles may affect the weight of the vehicle system.

In addition, the trip control system 200 is configured to receive external weather data, such as weather reports, from an off-board source. For example, the weather reports may be sent from a dispatch location and/or from the national weather service or other weather resources. The weather data may be received by the trip control system 200 using a communication system 208. The communication system 208 may include a transceiver and an antenna 209 configured to allow wireless communication with remote off-board locations. The trip control system 200 may use the weather data to predict the weather that the vehicles of the vehicle system will encounter at specific locations along the route during the trip. For example, a received weather report may indicate that the vehicle system will encounter a storm two hours into the trip when the vehicle system is about 100 miles into the route. Based on the amount of precipitation expected in the weather report, the trip control system 200 is able to predict an amount of precipitation from the storm that will be encountered by the vehicle system, and thus an amount of mass gain from retained precipitation.

In addition to weather reports regarding weather that the vehicle system will encounter during the trip, the communication system 208 of the trip control system 200 may also receive information about the weather that the vehicles have been exposed to prior to the trip. For example, before being assembled into the vehicle system, some of the vehicles may have been sitting in a stockyard where they were exposed to rain. Therefore, when the vehicle system is assembled, some vehicles may already have additional weight due to retained water. As such, the trip control system 200 receives weather data, such as rainfall data from the sensors and/or weather reports that were recorded prior to the vehicle system starting the trip in order to predict a more accurate weight of the vehicle system during the trip. The past weather information may be stored in the memory 206 of the trip control system 200.

The trip control system 200 also includes an input/output (I/O) device 210. The I/O device 210 may receive inputs from user devices, such as a keyboard, a mouse, a hand-held device (e.g., cell phone, tablet, PDA, etc.), and/or a graphical user interface on a display device local to the trip control system 200. For example, rain information may be input to the trip control system 200 from a rain sensor, the communication system 208, and/or by operator entry via the user interface of the I/O device 210. The I/O device 210 may output charts, graphs, and/or other indicia that are displayed on the display device and/or the user devices for the operator of the vehicle system. For example, the I/O device 210 may output weather maps, vehicle information, trip information, and trip plan instructions for controlling the vehicle system during the trip. Optionally, the output information may be stored in the memory 206 or sent to an external storage device.

The trip planner device 201 of the trip control system 200 is configured to generate a trip plan based at least in part on the received weather data of weather encountered and/or to be encountered by vehicles in the vehicle system. The trip plan includes operating parameters or orders for the vehicle system to follow during the trip, including route taken, time schedule, tractive efforts, braking efforts, speed and other operating instructions, energy usage, and the like. For example, at one location along the route, the trip plan may instruct or control the vehicle system to increase tractive efforts to increase speed, while the trip plan may instruct the vehicle system to apply brakes to decrease speed at another location along the route. The trip planner device 201 is configured to calculate a trip plan that is the most efficient way of traveling on the trip (e.g., from the start location to the destination) while abiding by constraints (for example, speed limits, schedules, and the like). For example, the trip plan may be produced to minimize energy consumption and establish a desired trip time, while abiding by safety and regulatory restrictions.

In order to produce the trip plan, the trip planner device 201 collects various input information regarding the vehicle system and upcoming trip, and processes the information to form the trip plan. For example, the trip planner device 201 may consider parameters such as weather, route (e.g., track) conditions, grade and geography along the route, length of the vehicle system, weight of the vehicle system, number and type of propulsion-generating vehicles, objectives of the trip (e.g., time and energy constraints), amount and type of cargo hauled by the vehicle system, and/or other parameters. The trip planner device 201 interprets the received information and computes the trip plan. The trip plan may be established using an algorithm based on models for vehicle behavior for the vehicle system along the route. In an embodiment, the trip planner device 201 includes a software application such as the Trip Optimizer™ system provided by General Electric Company, to control propulsion operations of the vehicle system during the trip.

The trip plan may be generated by the trip planner device 201 of the trip control system 200 before the vehicle system begins the trip, so some parameters used in the calculation of the trip plan, such as weather data and route conditions, may be predictions of what the vehicle system actually will encounter during the trip. In general, more accurate input information (including more accurate predicted conditions) allows the trip control system 200 to better control the movements of the vehicle system during the trip, by producing better handling and/or better energy efficiency. Weight of a vehicle system affects both control and energy usage of the vehicle system. For example, a heavier vehicle system would consume more energy during propulsion and braking efforts, take a longer time to attain an instructed speed, carry more inertia along curves, and the like. Therefore, an accurate determination of the weight of the vehicle system when calculating a trip plan supports the production of a trip plan that efficiently controls the vehicle system along the route, and reduces the occurrence of trip re-plans, as described below.

In an exemplary embodiment, the weight determination device 212 of the trip control system 200 is configured to estimate the weight of the vehicle system during the trip. The weight determination device 212 receives input information regarding the vehicle makeup and weather data, among other information. Vehicle makeup information may include the number and type of propulsion-generating vehicles and non-propulsion vehicles in the vehicle system, the amount and type of cargo hauled by the vehicle system, geographic information of where the vehicle system has been prior to the trip and/or where the vehicles have been prior to assembly into the vehicle system, and the like. The weather data includes information related to past weather encountered by the vehicle system and/or the vehicles prior to assembly into the vehicle system, current weather encountered by the vehicle system, and predicted weather to be encountered by the vehicle system during the trip. The weight determination device 212 interprets the received information to determine the weight of the vehicle system during the trip, including predicted changes in the weight of the vehicle system during the trip attributable to weather. The processor 202 (for example, the trip planner device 201) uses the determined weight data when calculating the trip plan.

The weight determination device 212 is configured to determine an estimated weight of the vehicle system during the trip by taking into account (for example, factoring in) mass that is attributable to weather encountered by vehicles in the vehicle system. For example, the vehicle system may include four propulsion-generating vehicles that weigh 150 tons each, and 100 non-propulsion vehicles that weigh 100 tons each while carrying a load. The total weight of the vehicle system is 10,600 tons, and this value is used by the trip control system 200 when producing the trip plan. However, if during the morning of the trip the vehicle system gets rained on, each of the 104 vehicles may retain, for example, two tons or more of water on or within the vehicles, adding a combined 208 tons to the overall weight of the vehicle system during the trip, which is an increase of 2% over the value used when producing the trip plan. This 2% difference may surpass a designated threshold, requiring a trip re-plan, as described below. In addition to rain, any type of precipitation, such as snow, sleet, hail, and freezing rain, may add additional mass to the vehicle system. Therefore, the weight determination device 212 of the trip control system 200 may be configured to factor in the mass gain attributable to the precipitation encountered by the vehicles. Doing so, the weight determination device 212 is able to better estimate the weight of the vehicle system during the trip than if the trip control system 200 did not account for mass attributable to weather. The estimated weight may then be used to predict expected movement characteristics of the vehicle system along the route. By taking into account mass attributable to weather, a more accurate determination of the weight and expected movements of the vehicle system may be made, resulting in better control over the vehicle system and fewer trip re-plans, as described below.

Although the trip plan may be generated by the trip planner device 201 of the trip control system 200 before the vehicle system begins the trip, the trip plan may be adjusted during the trip. For example, a trip re-plan is an adjustment to the trip plan that is made to produce an updated trip plan that better controls the vehicle system. A trip re-plan may results from one or more parameters that are observed during a trip to have an actual value that differs from an expected value according to the trip plan by an amount that exceeds a designated threshold. In an embodiment, the movement monitoring device 203 of the trip control system 200 is configured to monitor the movement of the vehicle system during the trip to determine how closely the expected movement of the vehicle system according to the trip plan mimics the actual movement of the vehicle system.

For example, the weight determination device 212 may determine that a vehicle system weighs 10,000 tons at time x during the trip, and the trip planner device 201 may generate the trip plan based on that value for the weight when the vehicle system is at time x. During the trip, the movement monitoring device 203 may monitor the actual movements and parameters of the vehicle system and compare the actual/monitored values to the expected values according to the trip plan. Using the estimated weight of 10,000 tons at time x, the trip plan may expect that the vehicle system will be moving at 50 miles per hour (mph) at time x using a pre-determined tractive effort. Based on actual measurements of speed and tractive effort at time x, the movement monitoring device 203 may determine that the vehicle system is actually moving 48 mph at time x instead of 50 mph as predicted. The disparity may be due to one or more inaccurate estimated parameters, such as the estimated weight. For example, if the vehicle system is actually heavier at time x than the estimated weight, the vehicle system may not move as fast as expected based on a given amount of tractive effort. This relationship between effort, speed, and mass may be shown in the equation $m=2W/v^2$, where m is mass (measured as weight), W is work or effort (for example, kinetic energy), and v is velocity (for example, speed). This equation, for example, illustrates how movement (for example, speed) is dependent on weight and work, so a more accurate estimation of weight may allow for the production of a trip plan with more accurate expected movements of the vehicle system during the trip.

If the actual measured weight of the vehicle system is calculated by the movement monitoring device 212 to be greater or less than the estimated weight of the vehicle system used in the production of the trip plan by more than a designated threshold, the trip control system 200 may be configured to perform a trip re-plan. The designated threshold may be a percentage, such as 1% or 2% of the expected parameter, or a value, such as 2.5 mph or 2 tons. During the trip re-plan, the weight determination device 212 may determine a new or second estimated weight of the vehicle system based at least in part on received weather data for weather encountered by the vehicle system, and the trip planner device 201 may use the second estimated weight to generate a revised or second trip plan for the vehicle system to travel according to during the trip. The trip re-plan may cost extra time and energy during the recalculation process. The trip re-plan also represents that the prior trip plan was based on information (for example, weight data and/or weather data) that was not accurate, and so was not the most efficient plan. Therefore, in general, trip re-plans are sought to be avoided when creating an initial trip plan.

Figure 3:
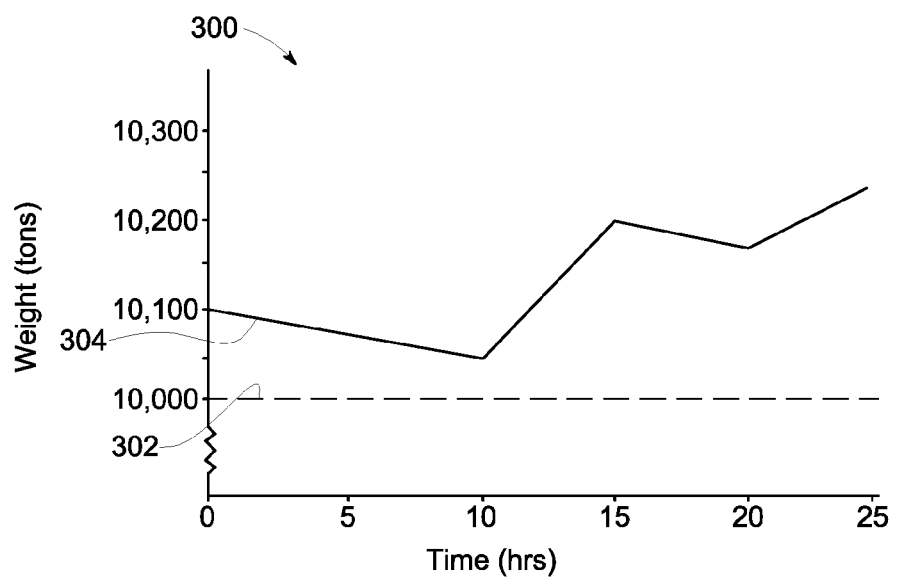
FIG. 3 is a graph showing the mass attributable to weather on a vehicle system over time during a trip.

FIG. 3 is a graph 300 showing mass attributable to weather on a vehicle system over time during a trip. The vehicle system may be vehicle system 102 (shown in FIG. 1) traveling along route 103 (shown in FIG. 1). The vehicle system has a dry weight 302 of 10,000 tons. At time 0, the vehicle system starts on its trip. The total weight 304 of the vehicle system represents the dry weight 302 plus any additional mass that is attributable to weather. At time 0, the vehicle system weighs 10,100 tons. Thus, there are 100 tons of extra mass on the vehicle system, which may be retained rain or another type of precipitation that was encountered by the vehicle system prior to starting on the trip. In addition, some of the extra mass may stem from precipitation encountered by some of the vehicles of the vehicle system at a different location prior to assembly into the vehicle system. For example, the vehicle system may include 150 vehicles, and 100 of the vehicles may be open-topped hoppers that have each retained 1 ton of rain while sitting in a stockyard prior to assembly into the vehicle system. Along the first 10 hours of the trip (e.g., from time 0 to 10), 50 tons of rain mass may drain from drains in the vehicles and/or evaporate. Thus, at 10 hours into the trip, the vehicle system weighs 10,050 tons. From time 10 to 15, however, the vehicle system travels through a geographic location that encounters a storm, and the vehicle system retains 150 tons of precipitation, bringing the total weight of the vehicle system to 10,200 tons (200 tons over the dry weight). For the next 5 hours, some of the retained mass evaporates and/or drains. Conditions such as the temperature, air pressure, humidity, type of cargo, and type of precipitation affect the evaporation rate. At time 20, however, the vehicle system once again encountered precipitation, and the total weight of the vehicle system increases to 10,250 tons.

In an exemplary embodiment, the weight determination device 212 (shown in FIG. 2) determines the weight of the vehicle system over time along the route, much like the data depicted in graph 300. The trip planner device 201 (shown in FIG. 2) uses the determined weight over time when calculating the trip plan in order to better control the vehicle system during the trip. As shown in graph 300, for the first ten hours of the trip, the total weight 304 is within 100 tons (or 1%) of the dry weight 302 of 10,000 tons, so neglecting mass attributable to weather might be acceptable (e.g., not exceed a designated threshold requiring a trip re-plan). However, from time 15 hours to 25 hours, the total weight 304 is between about 175 and 250 tons over the dry weight 302. This difference is more substantial and might require a trip re-plan, or at least would result in a trip plan that has reduced control over the vehicle system and/or less efficiency than a trip plan that more accurately accounts for mass from weather.

Figure 4:
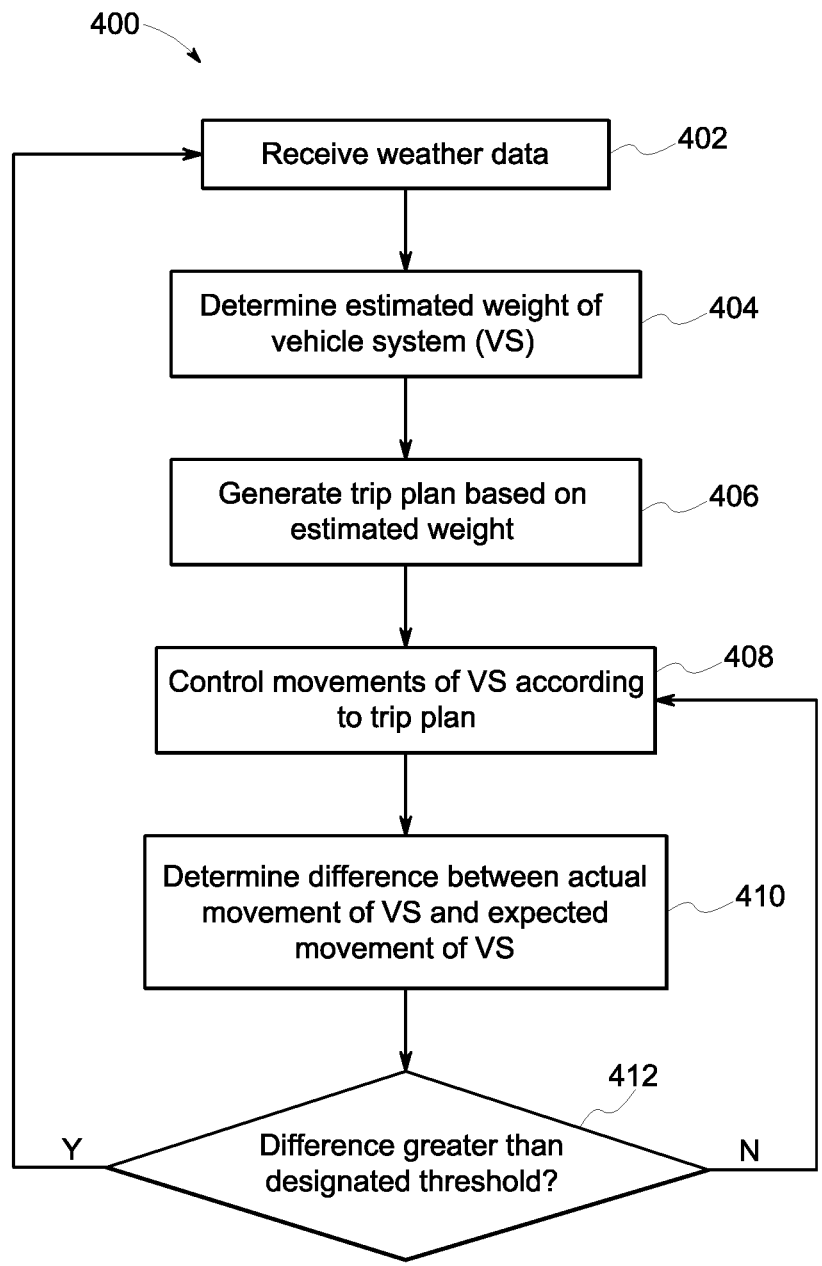
FIG. 4 is a flow diagram of an embodiment of a method for controlling a vehicle system factoring mass attributable to weather.

FIG. 4 is a flow diagram of an embodiment of a method 400 for controlling a vehicle system factoring mass attributable to weather. The method 400 may be performed at least partially by the trip control system 200 as shown in FIG. 2 and described herein. The vehicle system may be the vehicle system 100 shown in FIG. 1. At 402, weather data is received. The weather data relates to weather previously encountered and/or predicted to be encountered by one or more vehicles in the vehicle system as the vehicle system travels on a trip along a route. For example, the weather data may include past weather reports at locations of one or more of the vehicles currently in the vehicle system prior to the trip. The weather may even be encountered by the vehicles prior to assembly into the vehicle system. The weather data may also include predicted weather reports at locations along the route to be traveled by the vehicle system during the times that the vehicle system is to be traveling through the locations during the trip. The weather reports may be received via a communication from an off-board source, such as a dispatch and/or a weather service, such as the national weather service. Additionally, or alternatively, the weather data may be received via one or more precipitation sensors on one or more of the vehicles in the vehicle system, where the precipitation sensor(s) monitor precipitation amounts on the respective vehicle(s).

At 404, an estimated weight of the vehicle system is determined based at least in part on the weather data. The first time the method 400 is performed, the estimated weight may be referred to as a first estimated weight. Optionally, the estimated weight of the vehicle system may be determined prior to starting the trip based on weather that the vehicle system is predicted to encounter during the trip at locations along the route. The estimated weight accounts for mass attributable to the weather. For example, the estimated weight accounts for mass gained due to retention of precipitation within the vehicles in the vehicle system and/or mass lost due to release of precipitation from within the vehicles in the vehicle system. The mass gain may occur by retaining rain, snow, sleet, or other precipitant encountered by the vehicles on or within the vehicles. The precipitation may be released by draining through designated drainage conduits on the vehicles, by evaporation, and the like. In addition to the weather data, the estimated weight of the vehicle system may be determined based in part on a vehicle system makeup. The vehicle system makeup may include, among other information, a type and/or number of vehicles in the vehicle system and a type and/or amount of cargo hauled by the vehicle system. The vehicle makeup affects retention of precipitation within the vehicles because, for example, an open hopper vehicle may retain more precipitation than a vehicle with a closed top, and a finer grain cargo, such as sand, or an absorbent cargo, such as dirt, may retain more precipitation than a larger grain cargo, such as large rocks, or a less absorbent cargo, such as metal beams.

At 406, a trip plan is generated that is based at least in part on the estimated weight of the vehicle system. The trip plan includes operational settings that are designated for the vehicle system during the trip according to locations of the vehicle system as the vehicle system travels along the route. For example, the operations settings may include tractive and braking efforts that are correlated with locations along the route, such that the vehicle system employs a first designated tractive or braking effort at a first location and a second designated tractive or braking effort when the vehicle system reaches a different, second location. The trip plan is generated taking into account the estimated weight of the vehicle system. For example, if the vehicle system is predicted to retain a large amount of precipitation along the route, a prescribed braking effort in the trip plan used to slow the vehicle system down a hill to a designated speed may be greater than would otherwise be prescribed in a trip plan that does not take into account the mass attributable to weather, due to the extra inertia of the vehicle system carrying the added precipitation mass. The first time a trip plan is generated, the trip plan may be referred to as a first trip plan.

At 408, movements of the vehicle system are controlled according to the trip plan. For example, the vehicle system is controlled according to the operational settings prescribed in the trip plan based on where the vehicle system is located along the route. The vehicle system may be configured to autonomously implement the operational settings of the trip plan or may be configured to instruct an operator to implement the prescribed operational settings. Since the trip plan is generated based at least in part on the estimated weight that is based on the weather data, the movement of the vehicle system is also based at least in part on the estimated weight and the weather data.

At 410, a difference between an actual movement of the vehicle system and an expected movement of the vehicle system is determined. The actual movement of the vehicle system may be determined during the trip based on actual measurements of speed, power used (for example, work, effort), acceleration, and the like. The expected movement of the vehicle system may be determined based on the trip plan that is generated prior to starting the trip or at least prior to calculating the actual movement of the vehicle system. The difference between actual and expected movements may be determined during the trip while controlling the movements of the vehicle system along the route according to the trip plan. The difference between movements may include a difference in speed of the vehicle system for a given amount of tractive effort. For example, the trip plan may predict that the given amount of tractive effort will propel the vehicle system to a speed of 50 miles per hour (mph), while the actual measurement of the speed of the vehicle system during the trip as a result of the given amount of tractive effort is a speed of 47 mph. The difference of 3 mph may indicate that the vehicle system is heavier than estimated. Conversely, the difference between movements may include a difference in tractive effort of the vehicle system for a given speed. As such, if the vehicle system requires more or less power to attain a certain designated speed than was estimated, the difference in power may indicate that the vehicle system is heavier or lighter than estimated. In general, taking into account mass attributable to weather when determining an estimated weight of the vehicle system yields an expected movement of the vehicle system that is closer to the actual movement. As such, the difference between the actual and the expected movement of the vehicle system is smaller than if the trip plan was generated without taking the weather data into account.

At 412, a determination is made whether the difference between the actual movement and the expected movement of the vehicle system is greater than a designated threshold. The designated threshold may be a quantitative absolute value, such as 3 mph, or a percentage, such as 2% difference from the expected value. If the difference is not greater than the designated threshold, flow of the method 400 returns to step 408 where the movements of the vehicle system continue to be controlled according to the first (and only) trip plan. If, on the other hand, the difference is in fact greater than the designated threshold, flow of the method 400 returns to step 402 where additional weather data is received. Using the newly received weather data, a second or supplemental estimated weight of the vehicle system is determined, as shown at step 404. Then, returning to step 406, a second trip plan or a trip re-plan is generated based, at least in part, on the second estimated weight of the vehicle system. Movements of the vehicle system are thereafter controlled according to the second trip plan, as shown at step 408. Finally, a difference between the actual movement and the expected movement of the vehicle system is once again determined, and the difference is compared to the designated threshold to indicate whether the second trip plan is adequate or if a third trip plan should be generated to better control the vehicle system during the trip.

One or more of the embodiments described herein may have as a technical effect the ability to control a vehicle system by factoring the mass attributable to weather. Factoring the mass attributable to weather when determining the weight of the vehicle system during a trip may allow for better control and handling of the vehicle system during the trip, especially when movements of the vehicle system are controlled according to a trip plan calculated prior to the start of the trip. In addition, a more accurate determination of the weight of the vehicle system by factoring in precipitation retention mass, drying, and other effects of weather, may allow the creation of a trip plan that provides greater energy efficiency and reduces the occurrence of trip re-plans.

In an embodiment, a method (e.g., for controlling a vehicle system factoring mass attributable to weather) includes receiving weather data of weather at least one of encountered or to be encountered by one or more vehicles in the vehicle system traveling on a trip along a route. The method also includes, based at least in part on the weather data, determining a first estimated weight of the vehicle system. The first estimated weight accounts for mass attributable to the weather. The method further includes controlling movements of the vehicle system during the trip based at least in part on the first estimated weight of the vehicle system.

In an aspect, the method further includes generating a first trip plan based in part on the first estimated weight. The first trip plan includes operational settings that are designated for the vehicle system during the trip according to locations of the vehicle system as the vehicle system travels along the route. The movements of the vehicle system during the trip are controlled according to the operational settings prescribed in the first trip plan based on where the vehicle system is located along the route.

In an aspect, while controlling the movements of the vehicle system according to the first trip plan, the method also includes determining a difference between an actual movement of the vehicle system and an expected movement of the vehicle system. If the difference is greater than a designated threshold, the method further includes determining a second estimated weight of the vehicle system, generating a second trip plan based in part on the second estimated weight, and controlling movements of the vehicle system according to the second trip plan.

In an aspect, the difference between the actual movement of the vehicle system and the expected movement of the vehicle system is smaller than if the first trip plan was generated without taking the weather data into account.

In an aspect, the difference between the actual movement of the vehicle system and the expected movement of the vehicle system includes at least one of a difference in speed of the vehicle system for a given amount of tractive effort or a difference in tractive effort of the vehicle system for a given speed.

In an aspect, the determined first estimated weight of the vehicle system accounts for at least one of mass gain due to retention of precipitation within the vehicles in the vehicle system or mass loss due to release of precipitation from within the vehicles in the vehicle system.

In an aspect, the first estimated weight of the vehicle system is determined prior to starting the trip based on weather that the vehicle system is predicted to encounter during the trip at locations along the route.

In an aspect, the weather data is received via at least one of precipitation sensors on one or more of the vehicles in the vehicle system or weather reports communicated from an off-board source.

In an aspect, the weather data includes at least one of predicted weather reports at locations along the route traveled by the vehicle system during times that the vehicle system is to be traveling through the locations or past weather reports at locations of one or more of the vehicles in the vehicle system prior to the trip.

In an aspect, the first estimated weight of the vehicle system is determined based on the weather data and a vehicle system makeup. The vehicle system makeup includes at least one of a number of vehicles in the vehicle system, a type of vehicles in the vehicle system, an amount of cargo hauled by the vehicle system, or a type of cargo hauled by the vehicle system. The vehicle system makeup affects retention of precipitation within the vehicles of the vehicle system.

In an embodiment, a system includes a weight determination device and a trip planner device. The weight determination device is configured to receive weather data of weather at least one of encountered or to be encountered by one or more vehicles in a vehicle system traveling on a trip along a route. The weight determination device is further configured to determine a first estimated weight of the vehicle system based at least in part on the weather data. The first estimated weight accounts for mass attributable to the weather. The trip planner device is configured to generate a first trip plan based in part on the first estimated weight. Movements of the vehicle system during the trip are controlled according to the first trip plan.

In an aspect, the system further comprises at least one of a memory that stores past weather data of weather encountered by one or more of the vehicles in the vehicle system prior to the trip, a communication system that receives predicted weather data from an off-board source, or a precipitation sensor disposed on one or more vehicles in the vehicle system that records current weather data encountered by the one or more vehicles. The weight determination device is configured to receive the weather data from at least one of the memory, the communication system, or the precipitation sensor.

In an aspect, the first estimated weight of the vehicle system accounts for at least one of mass gain due to retention of precipitation within the vehicles in the vehicle system or mass loss due to release of precipitation from within the vehicles in the vehicle system.

In an aspect, the trip plan generated by the trip planner device designates operational settings of the vehicle system during the trip as a function of at least one of time or location of the vehicle system along the route as the vehicle system travels along the route. The operational settings include tractive and braking settings. The movements of the vehicle system during the trip are controlled according to the operational settings prescribed in the first trip plan.

In an aspect, the system further includes a weight monitoring device. The weight monitoring device is configured to determine a difference between the first estimated weight of the vehicle system based on expected movement of the vehicle system during the trip and a calculated actual weight of the vehicle system based on actual movement of the vehicle system during the trip.

In an aspect, if the weight monitoring device determines that the difference between the first estimated weight of the vehicle system and the calculated actual weight of the vehicle system is greater than a designated threshold, the weight determination device is configured to receive additional weather data and determine a second estimated weight of the vehicle system. The trip planner device is configured to generate a second trip plan based in part on the second estimated weight. Movements of the vehicle system during a remainder of the trip are controlled according to the second trip plan.

In an aspect, the difference between the first estimated weight of the vehicle system based on the expected movement of the vehicle system and the calculated actual weight of the vehicle system based on actual movement of the vehicle system during the trip is smaller than if the first trip plan was generated without taking the weather data into account.

In an aspect, the weight determination device determines the first estimated weight based on the weather data and a vehicle system makeup. The vehicle system makeup includes a type of cargo hauled by the vehicle system. The type of cargo affects retention of precipitation within the vehicles of the vehicle system.

In an embodiment, a method includes determining a precipitation retention mass associated with at least one vehicle of a vehicle system. The precipitation retention mass is determined based on received weather data of weather at least one of encountered by the at least one vehicle prior to a trip or to be encountered by the at least one vehicle while traveling along a route during the trip. The method also includes generating a trip plan based at least in part on the precipitation retention mass. The trip plan includes operational settings of the vehicle system as a function of at least one of time or location along the trip. The method further includes controlling the vehicle system along the route during the trip according to the trip plan.

In an aspect, the method further includes determining a difference between an actual movement of the vehicle system and an expected movement of the vehicle system along the route during the trip. The method also includes generating a trip re-plan if the difference exceeds a designated threshold.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. §112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the clauses, and may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses. The various embodiments are not limited to the arrangements and instrumentality shown in the drawings.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
    a weight determination device configured to receive weather data of weather at least one of encountered or to be encountered by one or more vehicles in a vehicle system traveling on a trip along a route, the weight determination device further configured to determine a first estimated weight of the vehicle system based at least in part on the weather data, wherein the first estimated weight accounts for mass attributable to the weather; and
    a trip control system configured to at least one of control the vehicle system for movement along the route based at least in part on the first estimated weight or display information of the first estimated weight on a display device for an operator to control the vehicle system for movement along the route based at least in part on the information of the first estimated weight that is displayed.

2. The system of claim 1, wherein the determined first estimated weight of the vehicle system accounts for at least one of mass gain due to retention of precipitation within the vehicles in the vehicle system or mass loss due to release of precipitation from within the vehicles in the vehicle system.

3. The system of claim 2, wherein the one or more vehicles are rail vehicles and the vehicle system is a train.

4. The system of claim 1, wherein the weight determination device is configured to determine the first estimated weight of the vehicle system prior to starting the trip based on the weather data of the weather to be encountered by the one or more vehicles in the vehicle system along the route.

5. The system of claim 1, further comprising precipitation sensors on one or more of the vehicles in the vehicle system, the precipitation sensors configured to generate the weather data, wherein the precipitation sensors are operably coupled to the weight determination device to provide the weather data to the weight determination device.

6. The system of claim 1, wherein the weight determination device is configured to receive the weather data from precipitation sensors on one or more of the vehicles in the vehicle system.

7. The system of claim 6, wherein the weight determination device is configured to receive the weather data from weather reports communicated from an off-board source.

8. The system of claim 1, wherein the weight determination device is configured to receive the weather data from precipitation sensors on one or more of the vehicles in the vehicle system and from weather reports communicated from an off-board source.

9. The system of claim 1, wherein the weather data includes at least one of predicted weather reports at locations along the route traveled by the vehicle system during times that the vehicle system is to be traveling through the locations or past weather reports at locations of one or more of the vehicles in the vehicle system prior to the trip.

10. The system of claim 9, wherein the one or more vehicles are rail vehicles and the vehicle system is a train.

11. The system of claim 1, wherein the weight determination device is configured to determine the first estimated weight of the vehicle system based on the weather data and a vehicle system makeup, the vehicle system makeup including at least one of a number of vehicles in the vehicle system, a type of vehicles in the vehicle system, an amount of cargo hauled by the vehicle system, or a type of cargo hauled by the vehicle system, wherein the vehicle system makeup affects retention of precipitation within the vehicles of the vehicle system.

12. The system of claim 11, wherein the one or more vehicles are rail vehicles and the vehicle system is a train.

13. The system of claim 1, further comprising at least one of a memory that stores past weather data of weather encountered by one or more of the vehicles in the vehicle system prior to the trip, a communication system that receives predicted weather data from an off-board source, or a precipitation sensor disposed on one or more vehicles in the vehicle system that records current weather data encountered by the one or more vehicles, wherein the weight determination device is configured to receive the weather data from at least one of the memory, the communication system, or the precipitation sensor.

14. The system of claim 13, wherein the one or more vehicles are rail vehicles and the vehicle system is a train.

15. The system of claim 1, further comprising a weight monitoring device, the weight monitoring device configured to determine a difference between the first estimated weight of the vehicle system based on expected movement of the vehicle system during the trip and a calculated actual weight of the vehicle system based on actual movement of the vehicle system during the trip.

16. The system of claim 1, wherein the one or more vehicles are rail vehicles and the vehicle system is a train.

17. A system comprising:
    a weight determination device configured to determine a precipitation retention mass associated with at least one vehicle of a vehicle system based on received weather data of weather at least one of encountered by the at least one vehicle prior to a trip or to be encountered by the at least one vehicle while traveling along a route during the trip; and a trip control system configured to generate a trip plan based at least in part on the precipitation retention mass, wherein the trip plan comprises operational settings of the vehicle system as a function of at least one of time or location along the trip, and wherein the trip control system is configured to at least one of control the vehicle system along the route during the trip according to the trip plan or control display of the operational settings to an operator of the vehicle system for the operator to control the vehicle system along the route during the trip according to the operational settings.

18. The system of claim 17, wherein the at least one vehicle is a rail vehicle.

19. The system of claim 17, wherein the trip control system is configured to determine a difference between an actual movement of the vehicle system and an expected movement of the vehicle system along the route during the trip, and to generate a trip re-plan if the difference exceeds a designated threshold.

20. The system of claim 19, wherein the at least one vehicle is a rail vehicle.

* * * * *